(No Model.)
W. T. CARROLL.
REVERSING MECHANISM FOR COUNTER SHAFTS.
No. 444,814. Patented Jan. 20, 1891.
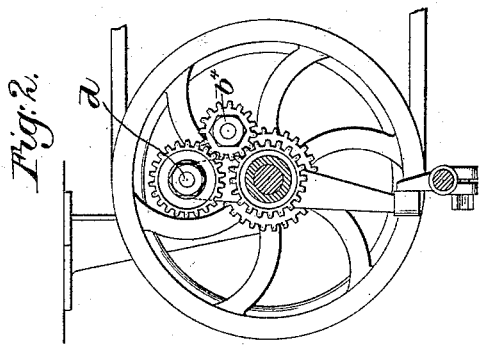
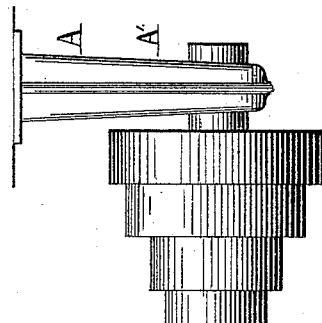
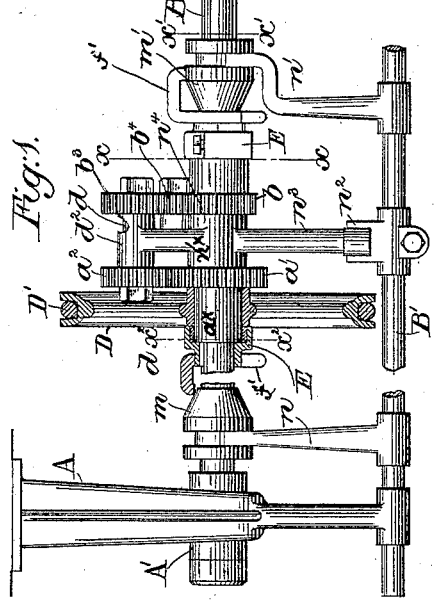
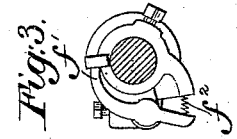
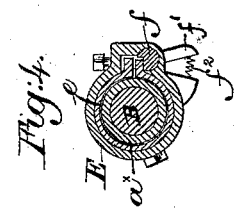
Witnesses:
Inventor:
William T. Carroll,
By Crosby & Gregory
attys.

UNITED STATES PATENT OFFICE.

WILLIAM T. CARROLL, OF WORCESTER, MASSACHUSETTS.

REVERSING MECHANISM FOR COUNTER-SHAFTS.

SPECIFICATION forming part of Letters Patent No. 444,814, dated January 20, 1891.

Application filed November 17, 1890. Serial No. 371,690. (No model.)

*To all whom it may concern:*

Be it known that I, WILLIAM T. CARROLL, of Worcester, county of Worcester, State of Massachusetts, have invented an Improvement in Reversing Mechanism for Counter-Shafts, of which the following description, in connection with the accompanying drawings, is a specification, like letters on the drawings representing like parts.

This invention has for its object to improve that class of mechanism employed to drive counter-shafts, whereby the said shafts may be reversed at will.

My improved mechanism includes a driven pulley having gear-teeth and a toothed pinion, both loose on a counter-shaft, a bearing-stand for a reversing-shaft, toothed gears on the said shaft and engaging the gears on the driven pulley and the loose pinion, combined with clutches carried by hubs fast to the counter-shaft and adapted to clutch, as desired, the hub of either the driven pulley or the loose pinion, and means under the control of a shipper-rod to actuate one or the other of the said clutches, whereby either may be made operative, according to the direction it is desired to rotate the counter-shaft.

Figure 1 in side elevation represents a counter-shaft with my improved reversing mechanism; Fig. 2, a section in the line $x$, Fig. 1, looking to the left; Fig. 3, a detail in the line $x'$, looking to the left, the conical hub or clutch-actuator $m'$ being omitted; and Fig. 4 is a section in the line $x^2$, Fig. 1.

The hangers A have usual bearings A' for the counter-shaft B, it having feather-keyed upon it two like conical hubs or clutch-actuators $m$ $m'$, each represented as provided with an annular groove which is entered by a forked end of an arm $n$ or $n'$ of a shipper-rod B', adapted to be slid in usual manner, and having upon it a collar having an ear $n^2$, the said ear acting as a stop for the lower end $n^3$ of the stand $n^x$, having a hub $n^4$ mounted loosely on the said counter-shaft, the upper end of the said stand having a bearing, as $d^2$, to receive a short reversing-shaft $d$, provided at its opposite ends with gears $a^2$ $b^3$. The driven pulley D, driven by a belt D', has its hub secured upon the hub $a^x$ of a gear $a'$, loose upon the counter-shaft B, the said hub $a^x$ being extended, as represented in Fig. 1, to the left of the hub of the driven pulley. The pinion $b$, having an extended hub at one side, is also loose on the shaft B. The gear $a'$, fast to the driven pulley, engages the gear $a^2$ on the reversing-shaft, and the intermediate gear $b^4$ causes the latter to rotate the pinion $b$ in engagement with the same, so that the gear $b^3$ on the said shaft in engagement with the pinion $b$ rotates the latter, and when the clutches, to be described, are not operated—as, for instance, the clutch at the left of the driven pulley—then both the driven pulley and the pinion $b$ and the gearing connecting them may be rotated without rotating the counter-shaft, the driven pulley rotating them in one direction and the pinion $b$ in the opposite direction.

The hub of the loose driven pulley or of the loose pinion $b$, moving in opposite directions, may be made at will to constitute the motor for the counter-shaft B, provided one or the other of the said hubs shall be joined by or through a clutch with a hub or collar fixed on the counter-shaft. To provide for this the hubs of both, of the driven pulley and of the pinion $b$, have co-operating with them like clutches, but one of which need be described specifically. Each clutch is composed, essentially, of a collar E, clasped in any suitable manner to the counter-shaft, and a split ring $e$, placed within the said collar and surrounding the hub of the pulley or wheel or pinion to be driven, the hub in Fig. 4 being marked $a^x$, it being supposed to be the hub of the gear $a'$, on which the driven pulley is fastened. Another part of the clutch is the rocking stud $f$ of a lever $f'$, one end of which (see Figs. 3 and 4) is normally acted upon by a spring $f^2$, so as to keep the opposite end of the said lever in position, as represented at the left in Fig. 1, to be struck by the cone or clutch-actuating device when the latter is moved longitudinally on the counter-shaft toward the said clutch, or when the cone or clutch-actuating device is in the position indicated by the actuating device $n'$ at the right in Fig. 1.

When the clutch-lever is moved by the clutch-actuator, it causes the stud or lug $f$ to be rocked, and in so doing it acts upon an ear of the clutch-strap $e$ and closes the same snugly upon the hub within it, and thereafter the said hub acts as a driver for the counter-shaft and rotates the same in one or the other direction, according to whether the clutch clasps the hub of the pinion $b$ or whether it clasps the hub upon which the driven pulley is secured. The nest of cones at the right in Fig. 1 are thus common to counter-shafts.

I claim—

The counter-shaft, the driven pulley D, a gear $a'$ and hub $a^\times$, connected together and loose on the said shaft, the pinion $b$, also loose on the said shaft, a stand having a bearing and reversing shaft therein, provided at its opposite ends with gears in engagement, respectively, with the gear fast to the driven pulley, and an intermediate gear $b^4$, pinion $b$, and clutch-actuating devices, combined with clutches normally rotating with the said counter-shaft and adapted to be engaged with either the hub $a^\times$, moving with the driven pulley, or with the hub of the pinion $b$, whereby the said counter-shaft may be driven in either of two directions at will, substantially as described.

In testimony whereof I have signed my name to this specification in the presence of two subscribing witnesses.

WILLIAM T. CARROLL.

Witnesses:
C. F. STEVENS,
WALTER L. ECCLES.